(12) United States Patent
Vialle et al.

(10) Patent No.: US 6,934,045 B1
(45) Date of Patent: Aug. 23, 2005

(54) PACKET LENGTH INDICATION FOR A FACSIMILE SYSTEM

(75) Inventors: Jerome Michel Vialle, Nice (FR); Michael Clement Whitfield, Valbonne (FR); Remy Gauguey, Le Cannet (FR)

(73) Assignee: Mindspeed Technologies, Inc., Newport Beach, CA (US)

( * ) Notice: Subject to any disclaimer, the term of this patent is extended or adjusted under 35 U.S.C. 154(b) by 880 days.

(21) Appl. No.: 09/696,562

(22) Filed: Oct. 25, 2000

(51) Int. Cl.[7] .................. G06K 1/00; H04M 11/00; H04J 3/16; H04N 1/00
(52) U.S. Cl. ............ 358/1.15; 379/93.15; 379/100.13; 370/466; 358/401
(58) Field of Search .............................. 358/1.15, 401, 358/405; 709/200; 379/93.15, 100.13; 340/3.21; 370/352, 465, 466

(56) References Cited

U.S. PATENT DOCUMENTS

| | | | |
|---|---|---|---|
| 6,687,354 B1 * | 2/2004 | Andreason | 379/198 |
| 2004/0196833 A1 * | 10/2004 | Dahan et al. | 370/352 |

OTHER PUBLICATIONS

Procedures for real-time Group 3 facsimile communication over IP networks, Series T: Terminals for Telematic Services, ITU-T Recommendation T.38 (Jun., 1998).

* cited by examiner

*Primary Examiner*—Kimberly Williams
*Assistant Examiner*—Thomas J. Lett
(74) *Attorney, Agent, or Firm*—Keith Kind

(57) ABSTRACT

A facsimile system is disclosed for transferring a facsimile using a Transmission Control Protocol/Internet Protocol (TCP/IP) network. The facsimile system comprises a first communication processing system and a second communication processing system. The first communication processing system converts the facsimile into application packets that indicate individual application packet lengths. The first communication processing system then converts the application packets into TCP/IP packets and transfers the TCP/IP packets to the TCP/IP network. The second communication processing system receives the transferred TCP/IP packets from the TCP/IP network and converts the transferred TCP/IP packets into transferred application packets. The second communication processing system converts the transferred application packets into the facsimile using the individual application packet lengths.

22 Claims, 3 Drawing Sheets

PACKET LENGTH INDICATION FOR A FACSIMILE SYSTEM

BACKGROUND OF THE INVENTION

1. Field of the Invention

The invention is related to the field of communication systems, and in particular, to a facsimile system that transfers facsimiles in packets that indicate individual packet length.

2. Statement of the Problem

Facsimile machines transfer documents over telephone lines and have become an important business tool. To send a facsimile, the sending facsimile machine scans the document into digital data and encodes the data to remove redundant data. The sending facsimile machine generates a modem call to the receiving facsimile machine and the two facsimile machines exchange tones and flags to set-up the transfer. The sending facsimile machine then converts the encoded digital data into an analog signal that it transfers over the telephone lines to the receiving facsimile machine. The receiving facsimile machine converts the analog signal back into the digital data and prints the document based on the digital data. One current standard for telephony facsimile transmission is International Telecommunication Union (ITU) Recommendation T.30.

Facsimile transmissions over local telephone lines are relatively inexpensive because local telephone calls are typically based on a flat rate fee. Transmission costs are essentially the same even if a large amount of facsimile transmissions are sent. Unfortunately, many facsimile transmissions require the use of long distance telephone lines that add additional expense, especially if international telephone lines are used.

One solution to this problem uses the Internet for a segment of the facsimile transmission. The sending facsimile machine transfers the facsimile transmission to an emitting gateway using a local telephone call. The emitting gateway receives the facsimile transmission in the same manner as a receiving facsimile machine. The emitting gateway then converts the facsimile transmission into Internet Protocol (IP) packets and transfers the IP packets over the Internet to a receiving gateway near the receiving facsimile machine. The receiving gateway converts the IP packets back into a facsimile transmission and transfers the facsimile transmission to the receiving facsimile machine using a local telephone call. The receiving gateway transfers the facsimile transmission in the same manner as a sending facsimile machine. One current standard for IP facsimile transmission is International Telecommunication Union (ITU) Recommendation T.38.

The Transmission Control Protocol (TCP) is often used for IP communications because TCP includes error control that IP does not. TCP can recover from lost, duplicated, or corrupted packets as follows. An application layer transfers a message block to the TCP layer. The TCP layer breaks the message block into segments with sequence numbers. The TCP layer transfers the segments in TCP packets to the IP layer. The IP layer encapsulates the TCP packets within IP packets and transfers the IP packets over the Internet to another IP layer. The receiving IP layer strips off the IP encapsulation and transfers the resulting TCP packets to a receiving TCP layer. The receiving TCP layer rebuilds the message block from the segments in the TCP packets. The receiving TCP layer returns an acknowledgment (ACK) to the sending TCP layer if it correctly received message block. The sending TCP layer re-transmits the message block if it is not properly acknowledged.

Because of the error control, TCP is useful for IP facsimile transmissions based on ITU T.38. An application layer based on ITU T.38 transfers application packets to the TCP layer. The TCP layer places the application packets into segments and transfers the resulting TCP packets. If an application packet is smaller than a segment, then there is room in the end of the segment to start the next application packet. Per TCP standards, the next application packet may be started in that segment and finished in the next segment.

The overlap of an application packet across segment boundaries may lose the application packet boundaries. The loss of application packet boundaries poses a serious problem to the receiving gateway because it cannot readily determine where packets begin and end. Even if the TCP layer is forced to send one application packet per TCP packet during normal transmission, the problem remains if there is a TCP re-transmit due to a lost or defective segment. This is because the TCP layer can re-transmit multiple application packets within the same segment despite the forcing rule on normal transmissions.

SUMMARY OF THE SOLUTION

The invention solves the above problem with a facsimile system that indicates individual application packet lengths. A receiving gateway can re-establish application packet boundaries lost during TCP/IP transfer by using the packet lengths. This solution is especially effective when there is a TCP re-transmit due to a lost or defective segment.

The invention includes systems and methods for transferring a facsimile using a Transmission Control Protocol/Internet Protocol (TCP/IP) network. A facsimile system comprises a first communication processing system and a second communication processing system. The first communication processing system converts the facsimile into application packets that indicate individual application packet lengths. The first communication processing system then converts the application packets into TCP/IP packets and transfers the TCP/IP packets to the TCP/IP network. The second communication processing system receives the transferred TCP/IP packets from the TCP/IP network and converts the transferred TCP/IP packets into transferred application packets. The second communication processing system converts the transferred application packets into the facsimile using the individual application packet lengths.

A particular reference number represents the same element on all figures.

DETAILED DESCRIPTION

Figure 1:
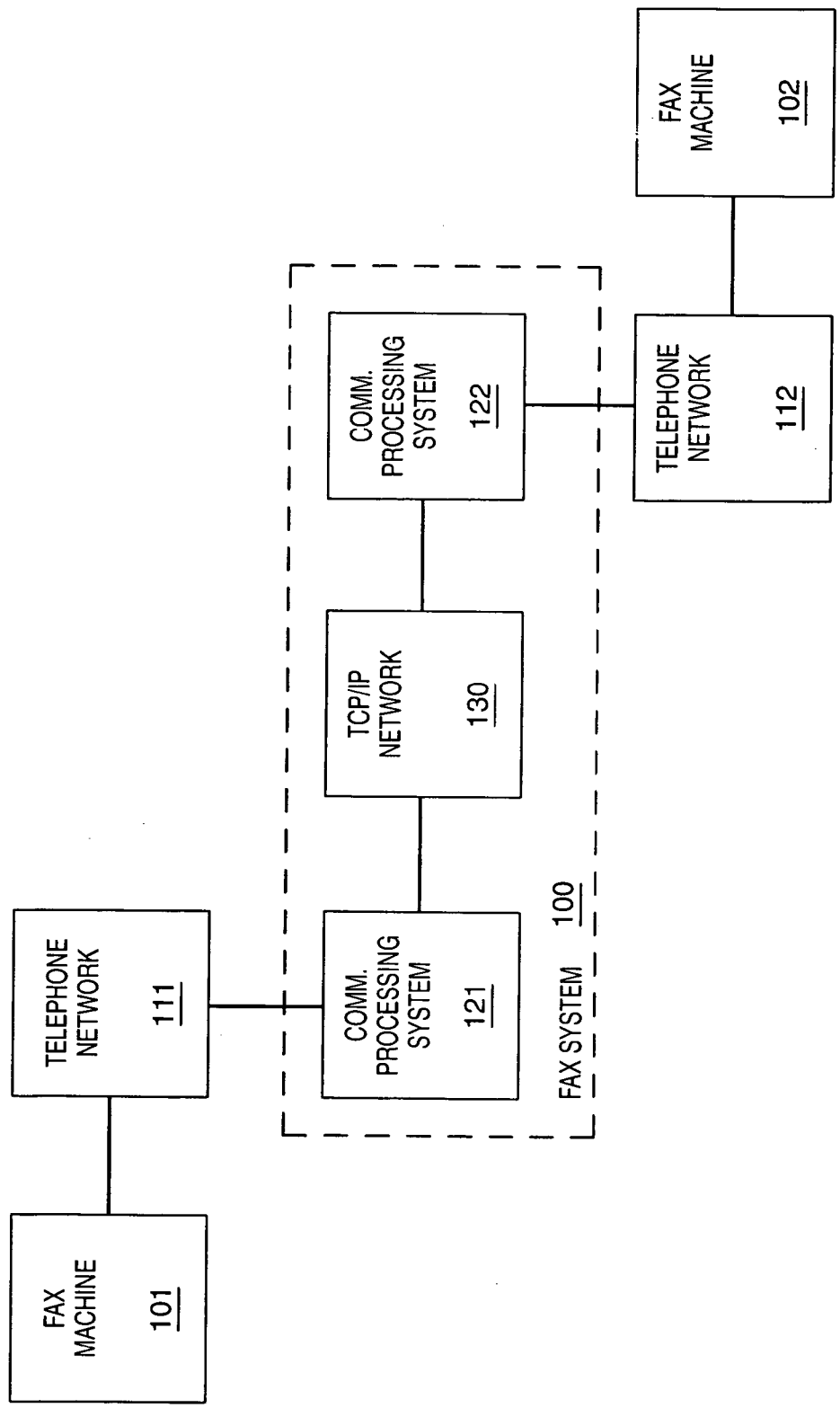
FIG. 1 is a block diagram that illustrates a facsimile system and its operating environment in an example of the invention.

Facsimile System and Operating Environment—FIG. 1

FIG. 1 depicts a specific example of a facsimile system in accord with the present invention. Those skilled in the art will appreciate numerous variations from this example that do not depart from the scope of the invention. Those skilled in the art will appreciate that various features described below could be combined to form multiple variations of the invention. Those skilled in the art will appreciate that some conventional aspects of FIG. 1 have been simplified or omitted for clarity.

FIG. 1 is a block diagram that illustrates facsimile system 100 and its operating environment in an example of the invention. Facsimile system 100 comprises communication processing systems 121 and 122 that are each connected to TCP/IP network 130. TCP/IP network 130 could be the Internet, although other TCP/IP networks are also within the scope of the invention. Facsimile machine 101 is connected to telephone network 111 which is connected to communication processing system 121. Facsimile machine 102 is connected to telephone network 112 which is connected to communication processing system 122.

Facsimile machine 101 transfers a facsimile in real time to facsimile machine 102 over facsimile system 100 and telephone networks 111–112 as follows. Facsimile machine 101 transfers the facsimile to communications processing system 121 through telephone network 111. Communication processing system 121 converts the facsimile into application packets and converts the application packets into TCP/IP packets. Communication processing system 121 transfers the TCP/IP packets to TCP/IP network 130. TCP/IP network 130 transfers the TCP/IP packets to communication processing system 122. Communication processing system 122 converts the transferred TCP/IP packets into transferred application packets and converts the transferred application packets into the facsimile. Communication processing system 122 transfers the facsimile to facsimile machine 102 through telephone network 112.

The boundaries for the transferred application packets are lost during TCP/IP transfer. In a distinct advance in the art, communication processing system 121 indicates individual application packet lengths in the application packets, and communication processing system 122 uses these individual application packet lengths when converting the transferred application packets into the facsimile. A facsimile transmission in the opposite direction from facsimile machine 102 to facsimile machine 101 could occur in a reciprocal manner. Aside from the modifications to communication processing systems 121 and 122 that are required to use application packet lengths, the configuration and operation of the components on FIG. 1 could be conventional.

Figure 2:
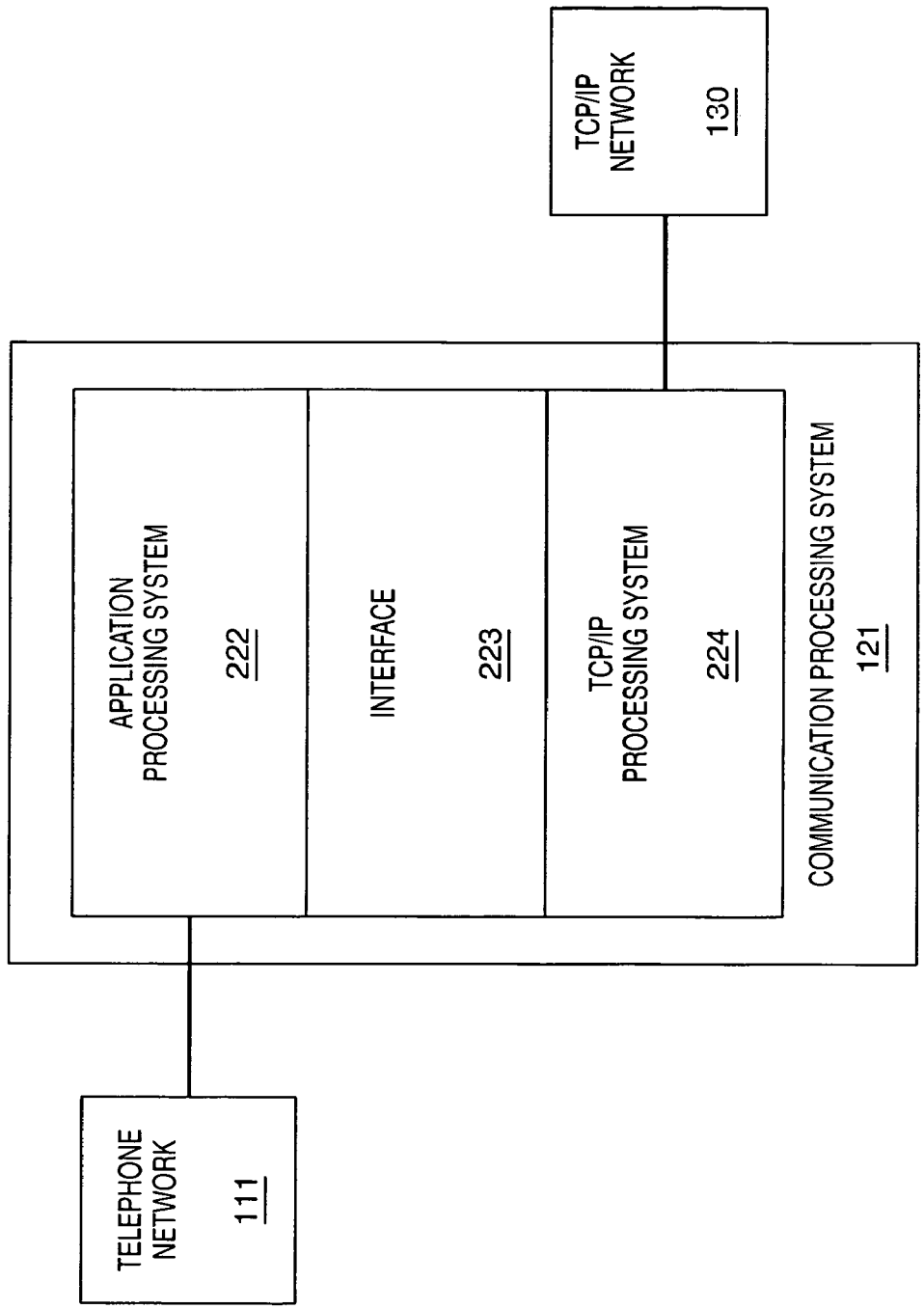
FIG. 2 is a block diagram that illustrates a communication processing system in an example of the invention.
Figure 3:
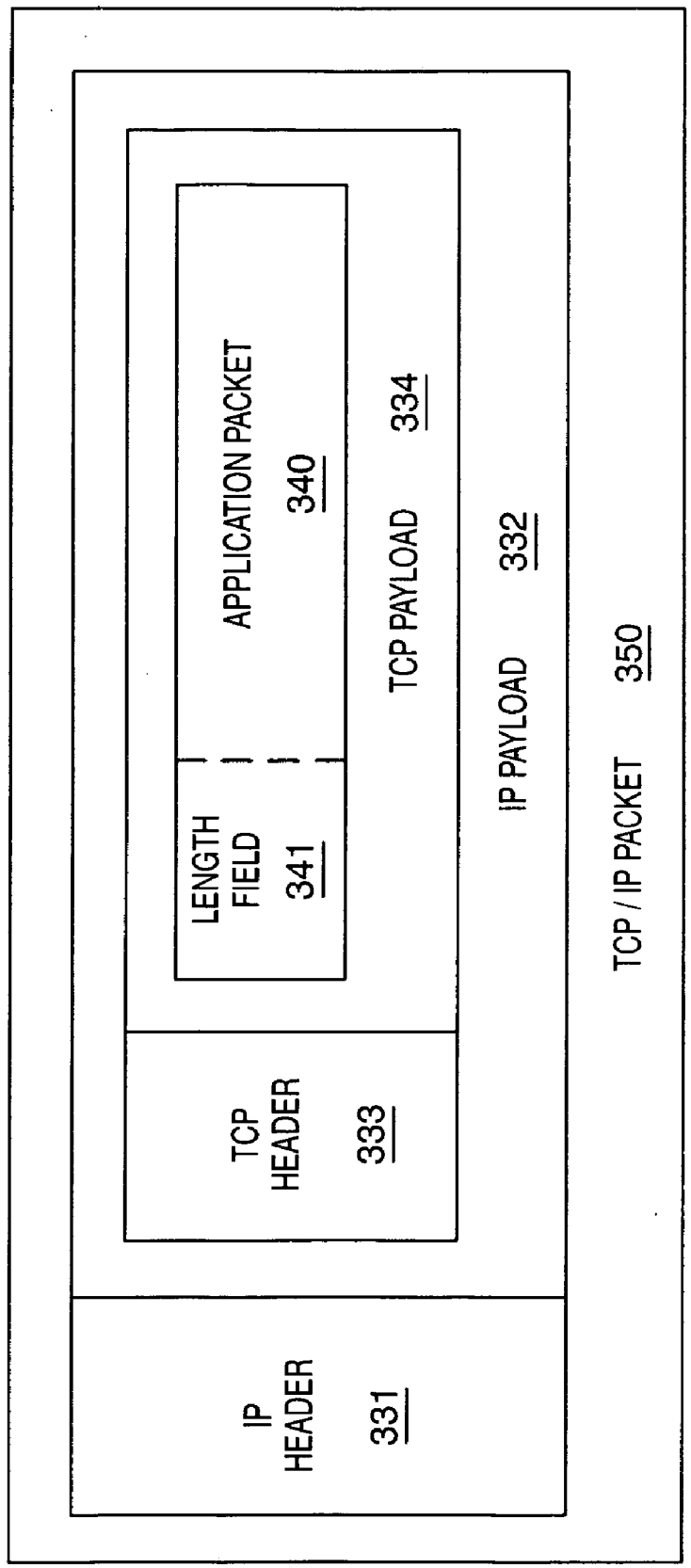
FIG. 3 is a logical diagram that illustrates a TCP/IP packet in an example of the invention.

Communication Processing System—FIGS. 2–3

FIGS. 2–3 depict a specific example of a communication processing system in accord with the present invention. Those skilled in the art will appreciate numerous variations from this example that do not depart from the scope of the invention. Those skilled in the art will also appreciate that various features described below could be combined with the above-described embodiment to form multiple variations of the invention. Those skilled in the art will appreciate that some conventional aspects of FIGS. 2–3 have been simplified or omitted for clarity.

FIG. 2 is a block diagram that illustrates communication processing system 121 in an example of the invention. Communication processing system 122 could be similar. Communication processing system comprises application processing system 222, interface 223, and TCP/IP processing system 224. Interface 223 is coupled to application processing system 222 and TCP/IP processing system 224. Application processing system 222 is connected to telephone network 111. TCP/IP processing system 224 is connected to TCP/IP network 130.

Application processing system 222 is configured to internetwork facsimile transmissions between telephone network 111 and TCP/IP processing system 224. In some embodiments of the invention, application processing system 222 operates based on ITU Recommendations T.30 and T.38 as modified by the invention. Interface 223 and TCP/IP processing system 224 could be conventional.

Application processing system 222 handles a facsimile call from telephone network 111 as follows. To set-up the transmission, application processing system 222 exchanges tones and data with telephone network 111 and exchanges corresponding application packets with TCP/IP processing system 224 through interface 223. Once the transmission is set-up, application processing system 222 receives the facsimile from telephone network 111, converts the facsimile into application packets, and transfers the application packets to TCP/IP processing system 224 through interface 223. Application processing system 222 determines the length of each application packet and indicates the length in a field in the respective application packet. The length field could be a two-byte field. TCP/IP processing system 224 exchanges application packets with application processing system, converts between the application packets and TCP/IP packets, and exchanges the TCP/IP packets with TCP/IP network 130.

Before packet transfer over TCP/IP network 130, application processing system 222 receives destination information for the facsimile. The destination information could be generated by facsimile machine 101 or telephone network 111 and could include a called number, an IP address, or some other routing code. Application processing system 222 processes the destination information to identify the IP address and the called number for the facsimile. The called number may not be needed if the destination facsimile machine on TCP/IP network 130. Application processing system 222 indicates the IP address to the TCP/IP processing system 224, which places the IP address in the TCP/IP packets. If required, application processing system 222 places the called number in an application packet for subsequent use on the other side of TCP/IP network 130.

FIG. 3 is a logical diagram that illustrates a TCP/IP packet 350 in an example of the invention. TCP/IP packet 350 comprises IP header 331 and IP payload 332. IP payload 332 includes TCP header 333 and TCP payload 334. TCP payload includes application packet 340. Application packet 340 carries the facsimile. application packet 340 includes length field 341 that indicates the length of application packet 340. Thus, length field 341 defines the boundaries of application packet 340—application packet 340 starts just after length field 341 and continues for the stated packet length.

Referring to FIG. 2, application processing system 222 handles a facsimile transmission from TCP/IP network 130. as follows. TCP/IP processing system 224 exchanges TCP/IP packets with TCP/IP network 130 and converts between the TCP/IP packets and application packets. It should be noted that the packet boundaries for these application packets may have been lost, so the application packets transferred to application processing system 222 may not be in discreet packets.

To set-up the transmission, application processing system 222 exchanges application packets with TCP/IP processing system 224 through interface 223 and exchanges corresponding tones and data with telephone network 111. Application processing system 222 receives the called number for the facsimile in one of the application packets. Once the transmission is set-up, the application processing system 222 then receives application packets from TCP/IP processing system 224, converts the application packets into the facsimile, and transfers the facsimile to telephone network 111 using the called number.

The application packets that application processing system 222 receives from TCP/IP processing system 224 may not have adequate packet boundaries. Application processing system 222 uses the length from the length field of each application packet to locate application packet boundaries that may have been lost in the TCP/IP transfer. This is especially important if a TCP re-transmit occurs due to a lost or defective TCP segment.

The above-described processing systems include storage media that store instructions and processors that retrieve and execute the instructions. Some examples of instructions are software, program code, and firmware. Some examples of storage media are memory devices, tape, disks, integrated circuits, and servers. The instructions are operational when executed by a processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for transferring a facsimile using a Transmission Control Protocol/Internet Protocol (TCP/IP) network, the method comprising:
   converting the facsimile into application packets that indicate individual application packet lengths;
   converting the application packets into TCP/IP packets;
   transferring the TCP/IP packets to the TCP/IP network and receiving the transferred TCP/IP packets from the TCP/IP network;
   converting the transferred TCP/IP packets into transferred application packets; and
   converting the transferred application packets into the facsimile using the individual application packet lengths.

2. The method of claim 1 further comprising receiving the facsimile from a telephone network.

3. The method of claim 1 further comprising transferring the facsimile to a telephone network.

4. The method of claim 1 where in the individual application packet lengths are indicated for each respective application packet by adding an application packet length field to the respective application packet.

5. The method of claim 1 further comprising converting the facsimile into the application packets and converting the transferred application packets into the facsimile using equipment implementing International Telecommunication Union Recommendation T.38.

6. A method for transferring a first facsimile and a second facsimile using a Transmission Control Protocol/Internet Protocol (TCP/IP) network, the method comprising:
   converting the first facsimile into first application packets that indicate individual first application packet lengths;
   transferring the first application packets to a TCP/IP layer;
   receiving second application packets from the TCP/IP layer; and
   converting the second application packets into the second facsimile using individual second application packet lengths in the second application packets.

7. The method of claim 6 further comprising in the TCP/IP layer:
   converting the first application packets into first TCP/IP packets;
   transferring the first TCP/IP packets to the TCP/IP network;
   receiving second TCP/IP packets from the TCP/IP network; and
   converting the second TCP/IP packets into the second application packets.

8. The method of claim 7 further comprising receiving the first facsimile from a telephone network.

9. The method of claim 7 further comprising transferring the second facsimile to a telephone network.

10. The method of claim 6 wherein the individual first and second application packet lengths are indicated for each respective application packet by adding an application packet length field to the respective application packet.

11. The method of claim 6 further comprising converting the first facsimile into the first application packets and converting the second application packets into the second facsimile using equipment implementing International Telecommunication Union Recommendation T.38.

12. A facsimile system for transferring a facsimile using a Transmission Control Protocol/Internet Protocol (TCP/IP) network, the facsimile system comprising:
   a first communication processing system configured to convert the facsimile into application packets that indicate individual application packet lengths, convert the application packets into TCP/IP packets, and transfer the TCP/IP packets to the TCP/IP network; and
   a second communication processing system configured to receive the transferred TCP/IP packets from the TCP/IP network, convert the transferred TCP/IP packets into transferred application packets, and convert the transferred application packets into the facsimile using the individual application packet lengths.

13. The facsimile system of claim 12 wherein the first communication processing system is configured to receive the facsimile from a telephone network.

14. The facsimile system of claim 12 wherein the second communication processing system is configured to transfer the facsimile to a telephone network.

15. The facsimile system of claim 12 wherein the first communication processing system is configured to indicate the individual application packet lengths for each respective application packet by adding an application packet length field to the respective application packet.

16. The facsimile system of claim 12 wherein the first and second communication processing systems are configured to implement International Telecommunication Union Recommendation T.38.

17. A communication processing system for transferring a first facsimile and a second facsimile using a Transmission Control Protocol/Internet Protocol (TCP/IP) network, the facsimile system comprising:
   an application processing system configured to convert the first facsimile into first application packets that indicate individual first application packet lengths and convert second application packets into the second facsimile using individual second application packet lengths in the second application packets; and an interface coupled to the application processing system and configured to transfer the first application packets to a TCP/IP processing system and receive the second application packets from the TCP/IP processing system.

18. The communication processing system of claim 17 further comprising the TCP/IP processing system coupled to the interface and configured to convert the first application packets into first TCP/IP packets, transfer the first TCP/IP packets to the TCP/IP network, receive second TCP/IP packets from the TCP/IP network, convert the second TCP/IP packets into the second application packets, and transfer the second application packets to the interface.

19. The communication processing system of claim 18 wherein the application processing system is further configured to receive the first facsimile from a telephone network.

20. The communication processing system of claim 18 wherein the application processing system is further configured to transfer the second facsimile to a telephone network.

21. The communication processing system of claim 17 wherein the application processing system is configured to indicate the individual first and second application packet lengths for each respective application packet by adding an application packet length field to the respective application packet.

22. The communication processing system of claim 17 wherein the application processing system is configured to implement International Telecommunication Union Recommendation T.38.

* * * * *